United States Patent
Song et al.

(10) Patent No.: US 11,152,013 B2
(45) Date of Patent: Oct. 19, 2021

(54) SYSTEMS AND METHODS FOR A TRIPLET NETWORK WITH ATTENTION FOR SPEAKER DIARTZATION

(71) Applicants: Huan Song, Tempe, AZ (US); Visar Berisha, Tempe, AZ (US); Andreas Spanias, Tempe, AZ (US); Megan Willi, Tucson, AZ (US); Jayaraman Thiagarajan, Dublin, CA (US)

(72) Inventors: Huan Song, Tempe, AZ (US); Visar Berisha, Tempe, AZ (US); Andreas Spanias, Tempe, AZ (US); Megan Willi, Tucson, AZ (US); Jayaraman Thiagarajan, Dublin, CA (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 221 days.

(21) Appl. No.: 16/530,304

(22) Filed: Aug. 2, 2019

(65) Prior Publication Data
US 2020/0043508 A1 Feb. 6, 2020

Related U.S. Application Data

(60) Provisional application No. 62/713,727, filed on Aug. 2, 2018.

(51) Int. Cl.
*G10L 21/028* (2013.01)
*G10L 25/24* (2013.01)
*G06N 3/04* (2006.01)
*G06N 3/08* (2006.01)
*G10L 25/30* (2013.01)

(52) U.S. Cl.
CPC ............ *G10L 21/028* (2013.01); *G06N 3/049* (2013.01); *G06N 3/08* (2013.01); *G10L 25/24* (2013.01); *G10L 25/30* (2013.01)

(58) Field of Classification Search
None
See application file for complete search history.

(56) References Cited

U.S. PATENT DOCUMENTS

| | | |
|---|---|---|
| 7,327,691 B2 | 2/2008 | Abousleman et al. |
| 8,392,198 B1 | 3/2013 | Berisha et al. |
| 9,055,374 B2 | 6/2015 | Krishnamoorthi et al. |
| 9,875,428 B2 | 1/2018 | Ramamurthy et al. |
| 10,037,677 B2 | 7/2018 | Zhong et al. |
| 10,290,200 B2 | 5/2019 | Zhong et al. |
| 2018/0276525 A1* | 9/2018 | Jiang .................. G06F 16/3329 |

(Continued)

FOREIGN PATENT DOCUMENTS

| | | |
|---|---|---|
| WO | 2014144306 A1 | 9/2014 |
| WO | 2014144306 A9 | 9/2014 |
| WO | 2020097412 A1 | 5/2020 |

OTHER PUBLICATIONS

Le Lan et a, "A Triplet ranking based neural network for speaker diarization and linking", Proc. Interspeech 2017, pp. 3572-3576, 2017 (Year: 2017).*

(Continued)

*Primary Examiner* — Linda Wong
(74) *Attorney, Agent, or Firm* — Polsinelli PC

(57) ABSTRACT

Various embodiments of a systems and methods for a triplet network having speaker diarization are disclosed.

15 Claims, 4 Drawing Sheets

(56) References Cited

U.S. PATENT DOCUMENTS

2019/0318725 A1* 10/2019 Le Roux ............... G10L 15/063
2021/0165791 A1* 6/2021 Kim ................. G06F 16/24578

OTHER PUBLICATIONS

Zhang et al, "End to end attention based text dependent speaker verification", IEEE 2016, pp. 171-178 (Year: 2016).*
Muda et al, "Voice Recognition Algorithms using Mel Frequency Cepstral Coefficient (MFCC) and Dynamic Time Warping (DTW) Techniques", Journal of Computing vol. 2, Issue 3, Mar. 2010, pp. 138-143 (Year: 2010).*
Li et al, "Deep Speaker: an End to End Neural Speaker Embedding System", https://arxiv.org/pdf/1705.02304.pdf, May 5, 2017, pp. 1-8 (Year: 2017).*
U.S. Appl. No. 15/693,699, Berisha et al., filed Sep. 1, 2017.
Anguera, et al., "Speaker diarization: A review of recent research," IEEE Transactions on Audio, Speech, and Language Processing, vol. 20, No. 2, pp. 356-370, 2012.
Barras, et al., "Multistage speaker diarization of broadcast news," IEEE Transactions on Audio, Speech, and Language Processing, vol. 14, No. 5, pp. 1505-1512, 2006.
Bredin, "pyannote. metrics: a toolkit for reproducible evaluation, diagnostic, and error analysis of speaker diarization systems," in Interspeech 2017, 18th Annual Conference of the International Speech Communication Association, 2017.
Bredin, "Tristounet: triplet loss for speaker turn embedding," in Acoustics, Speech and Signal Processing (ICASSP), 2017 IEEE International Conference on. IEEE, 2017, pp. 5430-5434.
Chopra, et al., "Learning a similarity metric discriminatively, with application to face verification," in Computer Vision and Pattern Recognition, 2005. CVPR 2005. IEEE Computer Society Conference on, vol. 1. IEEE, 2005, pp. 539-546.
Dehak, et al., "Front-end factor analysis for speaker verification," IEEE Transactions on Audio, Speech, and Language Processing, vol. 19, No. 4, pp. 788-798, 2011.
Garcia-Romero, et al., "Speaker diarization using deep neural network embeddings," in Acoustics, Speech and Signal Processing (ICASSP), 2017 IEEE International Conference on. IEEE, 2017, pp. 4930-4934.
Gordo, et al., "End-to-end learning of deep visual representations for image retrieval," International Journal of Computer Vision, vol. 124, No. 2, pp. 237-254, 2017.
Graves, et al., "Speech recognition with deep recurrent neural networks," in Acoustics, speech and signal processing (icassp), 2013 ieee international conference on. IEEE, 2013, pp. 6645-6649.
Hoffer, et al., "Deep metric learning using triplet network," in International Workshop on Similarity-Based Pattern Recognition. Springer, 2015, pp. 84-92.
Ioffe, et al., "Batch normalization: Accelerating deep network training by reducing internal covariate shift," arXiv preprint arXiv:1502.03167, 2015.
Kenny, "Bayesian speaker verification with heavy-tailed priors." in Odyssey, 2010, p. 14.
Khoury, et al., "Hierarchical speaker clustering methods for the nist i-vector challenge," in Odyssey: The Speaker and Language Recognition Workshop, 2014.
Koch, et al., "Siamese neural networks for one-shot image recognition," in ICML Deep Learning Workshop, vol. 2, 2015.
Krizhevsky, et al., "Imagenet classification with deep convolutional neural networks," in Advances in neural information processing systems, 2012, pp. 1097-1105.
Le Lan, et al., "A triplet ranking-based neural network for speaker diarization and linking," Proc. Interspeech 2017, pp. 3572-3576, 2017.
Lin, et al., "Learning deep representations forground-to-aerial geolocalization," in Proceedings of the IEEE conference on computer vision and pattern recognition, 2015, pp. 5007-5015.
Manmatha, et al., "Sampling matters in deep embedding learning," in Computer Vision (ICCV), 2017 IEEE International Conference on. IEEE, 2017, pp. 2859-2867.
Nair, et al., "Rectified linear units improve restricted boltzmann machines," in Proceedings of the 27th international conference on machine learning (ICML-10), 2010, pp. 807-814.
Pelleg, et al., "X-means: Extending k-means with efficient estimation of the number of clusters." in Icml, vol. 1, 2000, pp. 727-734.
Prazak, et al., "Speaker diarization using plda-based speaker clustering," in Intelligent Data Acquisition and Advanced Computing Systems (IDAACS), 2011 IEEE 6th International Conference on, vol. 1. IEEE, 2011, pp. 347-350.
Sak, et al., "Long short-term memory recurrent neural network architectures for large scale acoustic modeling," in Fifteenth annual conference of the international speech communication association, 2014.
Schroff, et al., "Facenet: A unified embedding for face recognition and clustering," in Proceedings of the IEEE conference on computer vision and pattern recognition, 2015, pp. 815-823.
Sell, et al., "Speaker diarization with plda i-vector scoring and unsupervised calibration," in Spoken Language Technology Workshop (SLT), 2014 IEEE. IEEE, 2014, pp. 413-417.
Shapiro, et al., "Clustering short push-to-talk segments," in Sixteenth Annual Conference of the International Speech Communication Association, 2015.
Song, et al., "Attend and diagnose: Clinical time series analysis using attention models," in Proceedings of the Thirty-Second AAAI Conference on Artificial Intelligence (AAAI-2018), 2018.
Sundermeyer, et al., "Lstm neural networks for language modeling," in Thirteenth Annual Conference of the International Speech Communication Association, 2012.
Tranter, et al., "An overview of automatic speaker diarization systems," IEEE Transactions on audio, speech, and language processing, vol. 14, No. 5, pp. 1557-1565, 2006.
Van Der Maaten, "Accelerating t-sne using tree-based algorithms." Journal of machine learning research, vol. 15, No. 1, pp. 3221-3245, 2014.
Vaswani, et al., "Attention is all you need," in Advances in Neural Information Processing Systems, 2017, pp. 6000-6010.
Wang, et al., "Speaker diarization with lstm," arXiv preprint arXiv:1710.10468, 2017.

* cited by examiner

SYSTEMS AND METHODS FOR A TRIPLET NETWORK WITH ATTENTION FOR SPEAKER DIARTZATION

CROSS REFERENCE TO RELATED APPLICATIONS

This is a non-provisional application that claims benefit to U.S. provisional application Ser. No. 62/713,727 filed on Aug. 2, 2018, which is herein incorporated by reference in its entirety.

GOVERNMENT SUPPORT

This invention was made with government support under 1540040 awarded by the National Science Foundation. The government has certain rights in the invention.

FIELD

The present disclosure generally relates to a triplet network; and in particular to systems and methods for employing attention models to learn embeddings and a similarity metric jointly in an end-to-end fashion.

BACKGROUND

In automatic speech processing systems, speaker diarization is a crucial front-end component to separate segments from different speakers. Inspired by the recent success of deep neural networks (DNNs) in semantic inferencing, triplet loss-based architectures have been successfully used for this problem. However, existing work utilizes conventional i-vectors as the input representation and builds simple fully connected networks for metric learning, therefore not fully leveraging the modeling power of DNN architectures.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1A:
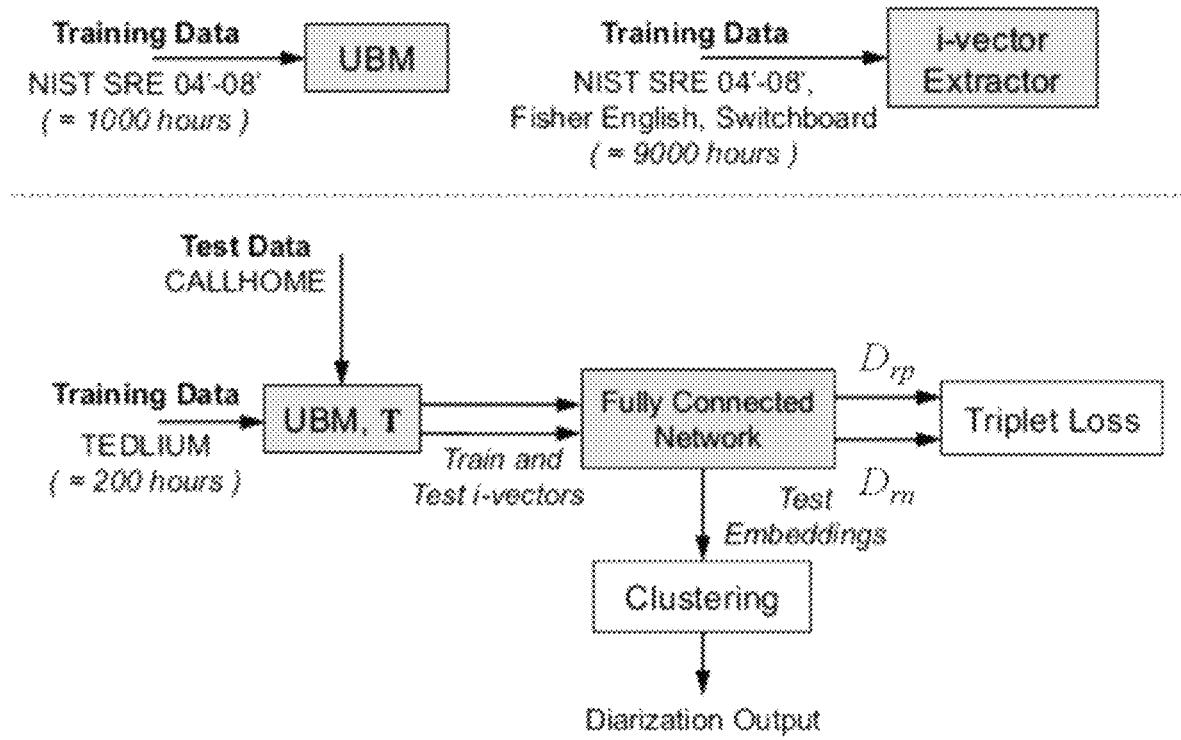
FIG. 1A is a simplified block diagram of a baseline approach showing i-vectors extracted using a large corpus of recording with GMM-UBM and i-vector extractor modules (top portion) and showing a similarity metric that is trained using a triple network trained on i-vectors.

The present disclosure discusses the importance of learning effective representations from the sequences directly in metric learning pipelines for speaker diarization. More specifically, various embodiments of systems and methods are disclosed herein for employing attention models to learn embeddings and a similarity metric jointly in an end-to-end fashion.

Introduction

With the ever-increasing volume of multimedia content on the Internet, there is a crucial need for tools that can automatically index and organize the content. In particular, speaker diarization deals with the problem of indexing speakers in a collection of recordings, without a priori knowledge about the speaker identities. In scenarios where the single-speaker assumption of recognition systems is violated, it is critical to first separate speech segments from different speakers prior to downstream processing. Typical challenges in speaker diarization include the need to deal with similarities between a large set of speakers, differences in acoustic conditions, and the adaptation of a trained system to new speaker sets.

An important class of diarization approach relies on extracting i-vectors to represent speech segments, and then scoring similarities between i-vectors using pre-defined similarity metrics (e.g. cosine distance) to achieve speaker discrimination. Despite its widespread use, it is well known that the i-vector extraction process requires extensive training of a Gaussian Mixture Model based Universal Background Model (GMM-UBM) and estimation of the total variability matrix (i-vector extractor) beforehand using large corpora of speech recordings. While several choices for the similarity metric currently exist, likelihood ratios obtained through a separately trained Probabilistic Linear Discriminant Analysis (PLDA) model are commonly utilized.

More recently, with the advent of modern representation learning paradigms, designing effective metrics for comparing i-vectors has become an active research direction. In particular, inspired by its success in computer vision tasks many recent efforts formulate the diarization problem as deep metric learning. For instance, a triplet network that builds latent spaces, wherein a simple Euclidean distance metric is highly effective at separating different classes, is a widely adopted architecture. However, in contrast to its application in vision tasks, metric learning is carried out on the i-vector representations instead of the raw data. Consequently, the first stage of the diarization pipeline stays intact, while the second stage is restricted to using fully connected networks. Though this modification produced state-of-the-art results in diarization and outperformed conventional scoring strategies, it does not support joint representation and task-based learning, which has become the modus operandi in deep learning. It has been proposed that joint embedding and metric learning be performed, but use siamese networks for metric learning, which have generally shown poorer performance when compared to triplet networks.

The present disclosure explores the use of joint representation learning and similarity metric learning with triplet loss in speaker diarization, while entirely dispensing the need for i-vector extraction. Encouraged by the recent success of self-attention mechanism in sequence modeling tasks for the first time, attention networks are leveraged to model the temporal characteristics of speech segments. Experimental results on the CALLHOME corpus have demonstrated that, with an appropriate embedding architecture, triplet network applied on raw audio features from a comparatively smaller dataset outperforms the same applied on i-vectors, wherein the GMM-UBM was trained using a much larger corpus.

Inventive Approach

Figure 1B:
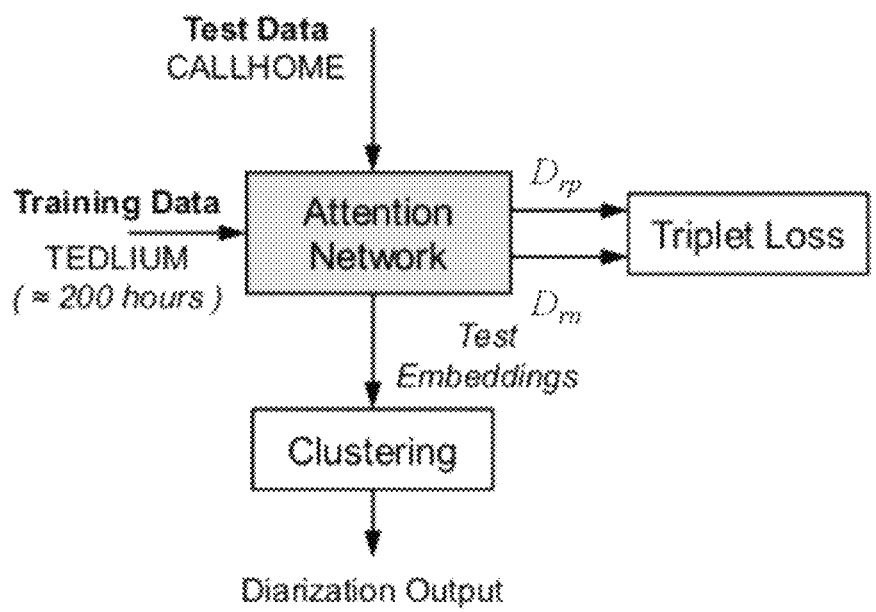
FIG. 1B is a simplified block diagram of an inventive approach showing embedding and the similarity metric for diarization.

As shown in FIG. 1B, in some embodiments the present approach works directly with raw temporal speech features to learn a similarity metric for diarization. Compared to the baseline in FIG. 1A, the two-stage training process is simplified into a single end-to-end learning strategy, wherein deep attention models are used for embedding computation and the triplet loss is used to infer the metric. Similar to existing diarization paradigms, the network is trained using out-of-domain labeled corpus, and then perform diarization on a target dataset using unsupervised clustering.

Temporal Segmentation and Feature Extraction

For the speech recordings, a non-overlapping temporal segmentation was first performed in 2-second segments. Following the Voice Biometry Standardization (VBS), MFCC features were extracted using 25 ms Hamming windows with 15 ms overlap. After adding delta and double-delta coefficients, 60-dimensional feature vectors are obtained at every frame. Consequently, each data sample corresponds to a temporal sequence feature $x_i \in R^{T \times d}$, where T is the number of frames in each segment and d=60 is the feature dimension.

Embeddings Using Attention Models

Figure 2:
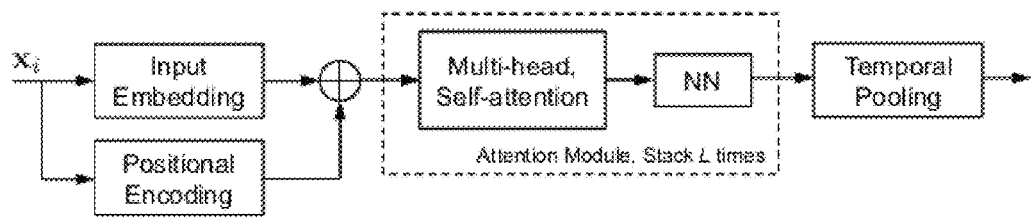
FIG. 2 is a simplified block diagram showing an attention model used for computing embedding from MFCC features of speech segments.

As described earlier, attention models are used to learn embeddings directly from MFCC features for the subsequent metric learning task. The attention model used in the inventive architecture disclosed herein is illustrated in FIG. 2. A module comprised of a multi-head, self-attention mechanism is the core component of the attention model. More specifically, denoting the input representation at layer l as $\{h_t^{l-1}\}_{t=1}^{T}$, the hidden representation can be obtained at time step i based on attention as follows:

$$h_i^l = \sum_{t=1}^{T} w_t^{(i)} h_t^{l-1}, \ 1 \leq i \leq T, \quad (1)$$

$$w_t^{(i)} = softmax\left(\frac{h_i^{l-1} \cdot h_t^{l-1}}{\sqrt{D}}\right), \quad (2)$$

$$h_i^l = \mathcal{F}(h_i^l), \quad (3)$$

Here, D=256 refers to the size of the hidden layer and F denotes a feed-forward neural network. The attention weight in equation (2) denotes the interaction between temporal positions i and t. During the computation of hidden representation at time step i, $w_t^{(i)}$ weights the contribution from other temporal positions. Note that, these representations were processed by F before connecting to the next attention module, as shown in FIG. 2. A 1D convolutional layer (kernel size is 1) was employed with ReLU activation for F. Finally, the attention module was stacked L times to learn increasingly deeper representations.

Attention-based representations in equation (1) were computed within each speech segment independently and hence this process is referred to as self-attention. Furthermore, the hidden representations $h_t^l$ were computed using H different network parameterizations, denoted as heads, and the resulting H attention representations were concatenated together. This can be loosely interpreted as an ensemble of representations. Such a multi-head operation facilitates dramatically different temporal parameterizations and significantly expands the modeling power. The current implementation sets L=2 and H=8.

Although attention computation explicitly models the temporal interactions, it does not encode the crucial ordering information contained in speech. The front-end positional encoding block handles this problem by mapping every relative frame position t in the segment to fixed locations in a random lookup table. As shown in FIG. 2, the encoded representation was subsequently added up with the input embedding (obtained also from a 1D CNN layer). Finally, a temporal pooling layer was included to reduce the final representation $h^L \in R^{T \times D}$ into a D-dimensional vector by averaging along the time-axis.

Metric Learning with Triplet Loss

The representations from the deep attention model were then used to learn a similarity metric with the triplet ranking loss. Note that the attention model parameters and the metric learner were optimized jointly using back-propagation. In a triplet network, each input was constructed as a set of 3 samples $x=\{x_p, x_r, x_n\}$, where $x_r$ denoted an anchor, $x_p$ denoted a positive sample belonging to the same class as $x_r$, and $x_n$ a negative sample from a different class. Each of the samples in x were processed using the attention model $A(\bullet)$: $R^{T \times d} \to R^D$ and distances are computed in the resulting latent spaces:

$$D_{rp} = \|A(x_r) - A(x_p)\|_2$$

$$D_{rn} = \|A(x_r) - A(x_n)\|_2$$

The triplet loss was defined as $$l(x_p, x_r, x_n) = \max(0, D_{rp}^2 - D_{rn}^2 + \alpha) \quad (4)$$

where $\alpha$ was the margin and the objective was to achieve $D_{rn}^2 \geq D_{rp}^2 + \alpha$. In comparison, the contrastive loss included the hinge term $\max(0, \alpha - D_{ij})$ for different-class samples $x_i$ and $x_j$, and hence required $\alpha$ to be a global margin. Such a formulation significantly restricted the model flexibility and expressive power.

Given a large number of samples N, the computation of equation (4) is infeasible among the $O(N^3)$ triplet space. It is tempting to greedily select the most effective triplets, which maximizes $D_{rp}$ and minimizes $D_{rn}$. Instead of performing such hard sampling, known methods were used to sample all possible $x_p$ and only selecting semi-hard $x_n$: the negative samples satisfying $D_{rp}^2 \leq D_{rn}^2 \leq D_{rp}^2 + \alpha$. In addition, an online sampling strategy was adopted that restricted the sampling space to the current mini-batch during training. All sampled triplets are gathered to compute the loss in equation (4). The use of the distance vectors $D_{rp}$ and $D_{rn}$, and the triplet loss aids in speaker diarization as samples in close proximity to each other are more likely to be linked to a particular speaker. In this manner, the computation of the similarity metric is used to cluster samples in embedded space and perform speaker diarization based on the proximities of samples in relation to each other.

For the online sampling scheme, the mini-batch construction step was crucial. Ideally, each batch should cover both a large number of speakers and sufficient samples per speaker. However, the GPU memory (8 GB) imposes a constraint and in this case, a maximum batch size of only B=256 was set. M was preset as the number of speakers per batch and when sampling each mini-batch, M speakers are first sampled and B/M speech segments are then sampled for every speaker. As a result, the parameter M represents the trade-off between modeling more speakers each time, and covering sufficient samples for those speakers. In the experiments, M was tuned based on the performance on the development set, as will be discussed herein.

Experiments

Experiments were conducted on the CALLHOME conversational speech corpus. The diarization results demonstrated that, besides providing a unified model, the disclosed approach achieved improved performance when compared against existing approaches.

Triplet Network Training

The disclosed model was trained on the TEDLIUM corpus which consisted of 1495 audio recordings. After ignoring speakers with less than 45 transcribed segments, a set of 1211 speakers was obtained with an average recording length of 10.2 minutes. All recordings were down-sampled to 8 kHz to match the target CALLHOME corpus. The temporal segmentation and MFCC extraction were carried out as discussed herein.

Figure 3A:
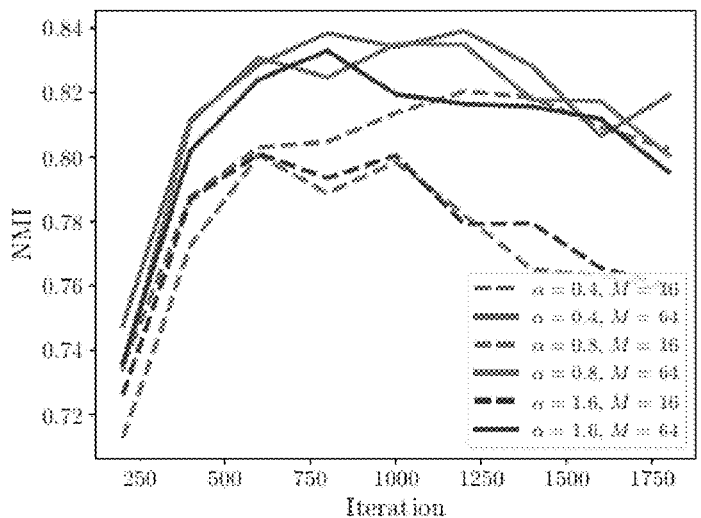
FIG. 3A is a graphical representation showing an NMI score from speaker clustering results.
Figure 3B:
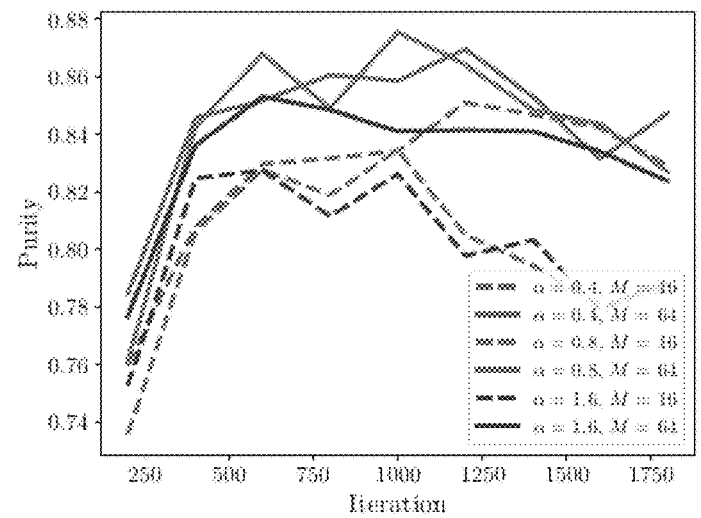
FIG. 3B is a graphical representation showing a purity score from the speaker clustering results.

For the inventive approach, there are two important training parameters that need to be selected, i.e. triplet margin a and the number of speakers per mini-batch M. In order to quickly configure the parameters, a training subset was built by randomly selecting 20% of the total recordings and a development set by taking 50 recordings from the original TEDLIUM train, dev and test sets. At every 200 iterations of training on the subset, the embeddings were extracted for the development set and perform speaker clustering using k-Means, with a known number of speakers. The clustering performance is evaluated by the standard Normalized Mutual Information (NMI) and Purity scores. Based on this procedure, both parameters were jointly tuned by performing a grid search on $\alpha$=[0.4, 0.8, 1.6] and M=[8, 16, 32, 64]. As shown in FIGS. 3A and 3B, having a higher M value consistently provided better clustering results and alleviated model overfitting. Additionally, a lower triplet margin generally helps the training process. Based on these observations, the values were configured to be $\alpha$=0.8, M=64 to train the model on the entire TEDLIUM corpus.

Figure 4:
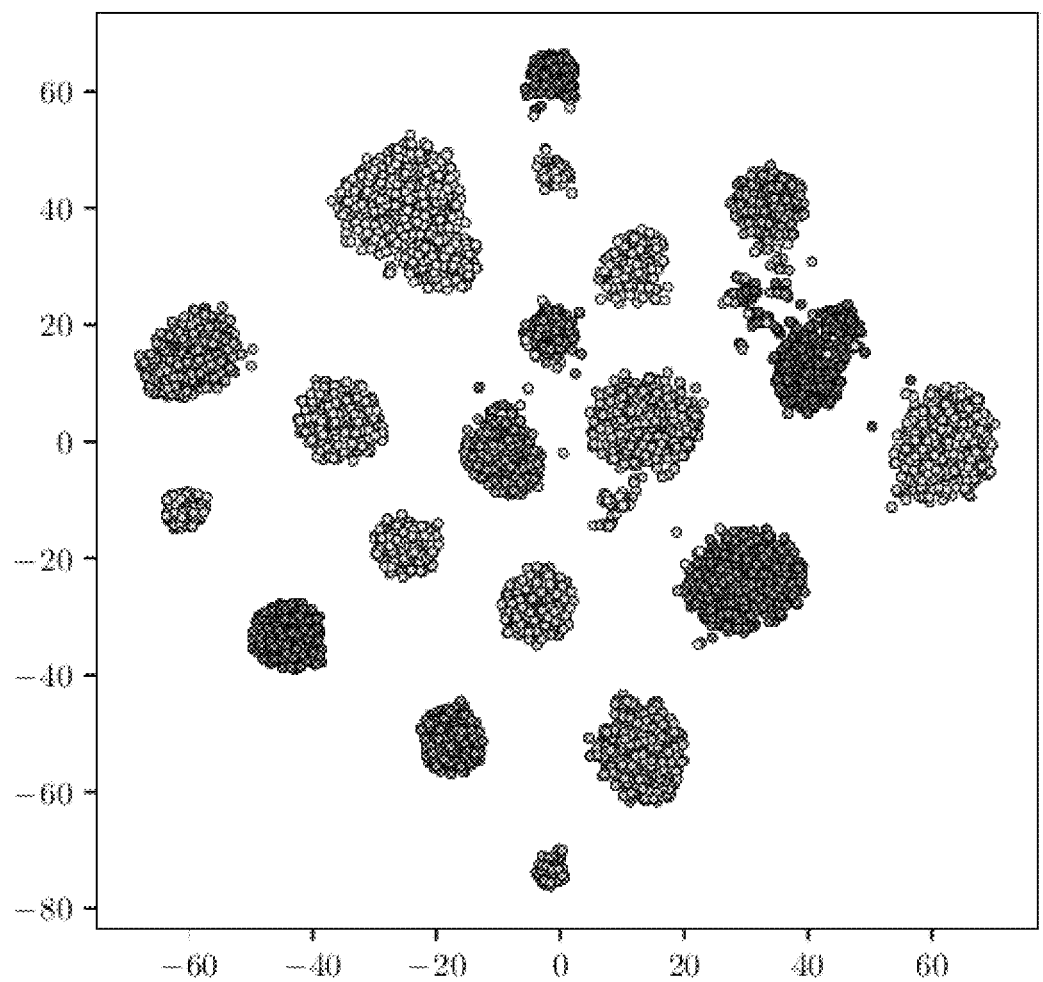
FIG. 4 is an illustration showing a two-dimensional visualization of the first 20 speakers from a TEDLIUM development set.

To study the embeddings from the attention model and the impact of triplet loss, 2D t-SNE visualization of samples in the development set in FIG. 4. It is observed that the model is highly effective at separating unseen speakers and provides little distinction on segments from the same speakers. These embeddings achieve 0.94 score on both NMI and Purity, with k-Means clustering for the development set.

Diarization Results

The trained model was evaluated on the CALLHOME corpus for diarization performance. CALLHOME consists of telephone conversations in 6 languages: Arabic, Chinese, English, German, Japanese and Spanish. In total, there are 780 transcribed conversations containing 2 to 7 speakers. After obtaining the embeddings through the inventive approach, x-means were performed for estimating the number of speakers and then use k-means clustering with the estimation. An x-means were forced to split at least 2 clusters by initializing it with 2 centroids. Note that there are usually multiple moving parts on complete diarization systems in the literature. In particular, more sophisticated clustering algorithms, overlapping test segments and calibration can be incorporated to improve the overall diarization performance. However, in this disclosure, investigations of the efficacy of the DNN modeling and fixing the other components in their basic configurations are the primary focuses.

TABLE 1

Diarization Results on CALLHOME Corpus.

| System | | DER (%) |
| --- | --- | --- |
| i-vector | cosine | 18.7 |
| | PLDA [1] | 17.6 |
| | Triplet with FCN [5] | 13.4 |
| | Proposed Approach | 12.7 |

A pyannote.metric was utilized to calculate Diarization Error Rate (DER) as the evaluation metric. Although DER collectively considers false alarms, missed detections and confusion errors, most existing systems evaluated on CALL-HOME accounts for only the confusion rate and ignores overlapping segments. Following this convention, only the non-overlapping sections of the oracle speech activity regions. Additionally, there is a collar tolerance of 250 ms at both beginning and end of each segment. The inventive approach was compared with the following baseline systems:

Baseline 1: i-vector+cosine/PLDA scoring. VBS pre-trained models were utilized for i-vector extraction on CALL-HOME corpus. The specific GMM-UBM and i-vector extractor training data are shown in FIG. 1A. Though different from ours, the training corpus is significantly more comprehensive than the TEDLIUM set that was used. The GMM-UBM consists of 2048 Gaussian components and the i-vectors are 600-dimensional. The backend LDA model contained in VBS is also used for i-vector pre-processing. In the actual clustering, cosine or PLDA scores are used to calculate the sample-to-centroid similarities at each iteration.

Baseline 2: i-vector+triplet with FCN training. This baseline is very similar to previous works except for 2 modifications: 1) The speaker linking procedure is not considered as there were very few repeated speakers in CALLHOME. 2) A larger FCN network is used to allow a fair comparison to the proposed approach. The hidden layers have size 512-1024-512-256 and batch normalization is applied at each layer after the ReLU activation. Further, i-vectors are extracted on TEDLIUM based on the transcribed speech sections with average length of 8.6 seconds. The triplet network is tuned in a similar procedure as set forth herein and the best parameters were found to be $\alpha$=0.4, M=16.

The comparison between the inventive approach and the conventional baselines is shown in Table 1. It is observed that baseline 2 indeed exceeds both conventional i-vector scoring methods. However, the unified learning approach trained on a much smaller TEDLIUM corpus achieved better performance, which evidences the effectiveness of end-to-end learning.

Computing System

Figure 5:
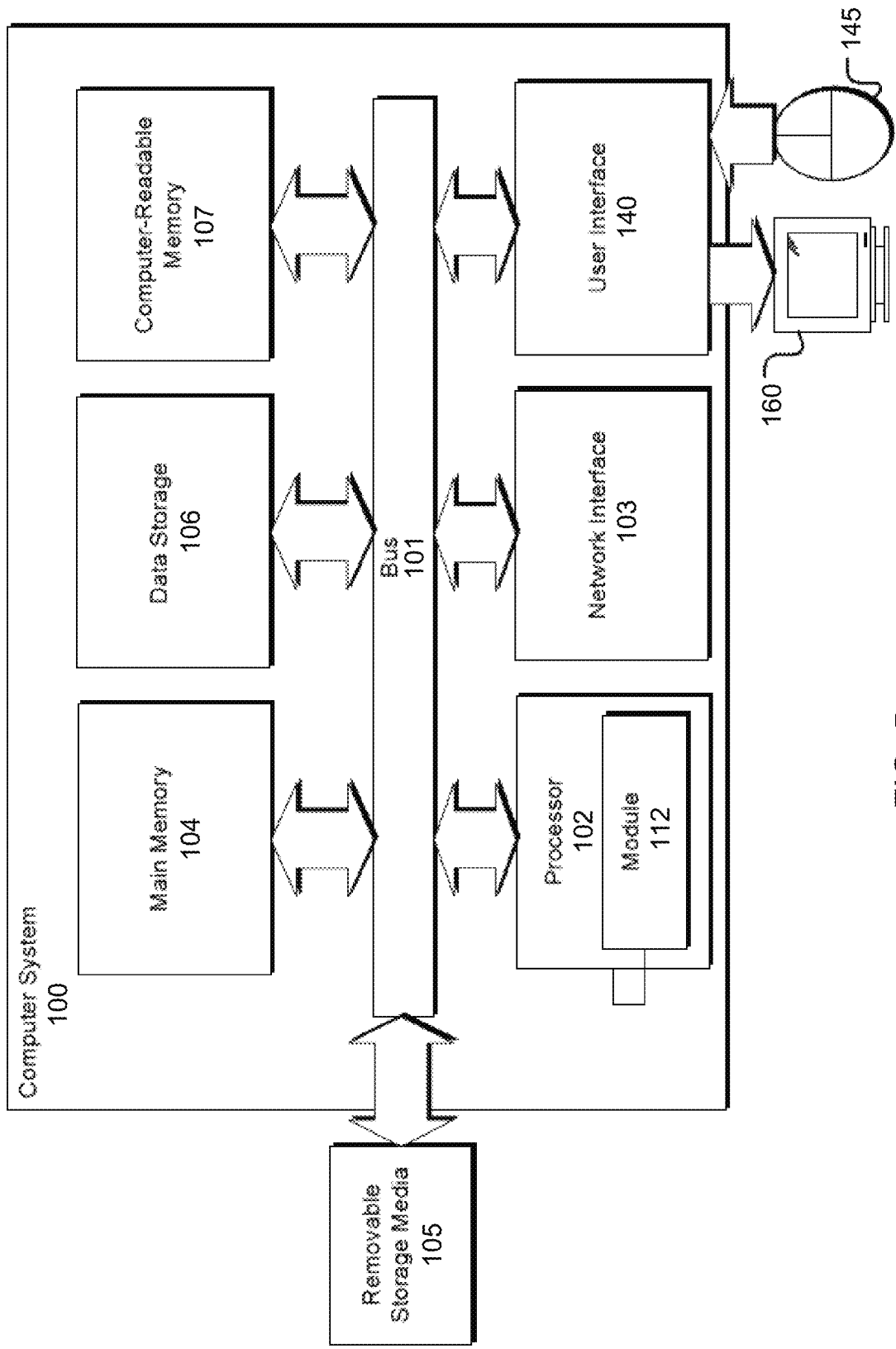
FIG. 5 is an example schematic diagram of a computing system that may implement various methodologies of the inventive approach.

FIG. 5 illustrates an example of a suitable computing system 100 used to implement various aspects of the inventive approach. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 102, a main memory 104 (e.g., a system memory), and a system bus 101 that couples various system components of the general purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for the diarization of speakers in a speech audio sample, comprising:
    segmenting an audio recording featuring one or more speakers in the time-domain into a plurality of audio samples, wherein a set of temporal sequence features or a set of mel-frequency cepstral coefficients are extracted from each of the plurality of audio samples;
    learning a set of hidden representations from a set of hidden embeddings using an attention model, wherein the attention model is implemented using a neural network and wherein a set of encoded ordering information are used to learn the set of hidden representations and wherein the set of mel-frequency cepstral coefficients are used to learn the set of hidden embeddings;
    learning a similarity metric between each of the plurality of audio samples using a metric learner, wherein the metric learner computes the triplet ranking loss using the set of hidden representations and the set of temporal sequence features, and wherein the metric learner is implemented using the neural network; and
    performing speaker clustering using the similarity metric, wherein the result of speaker clustering diarizes the one or more speakers featured in the audio recording,
    wherein the neural network is iteratively trained using a labeled corpus,
    wherein a set of semi-hard triplets are used to learn the similarity metric, and wherein a sampling space is restricted to one of a set of mini-batches while training the neural network, and
    wherein the set of mini-batches are constructed using a batch size B and an allowance of M speakers per batch, wherein the M speakers are first sampled and a set of B/M audio samples are sampled for each of the M speakers.

2. The method of claim 1, wherein the mel-frequency cepstral coefficients are extracted from each of the plurality of audio samples using Hamming windows.

3. The method of claim 2, wherein a set of delta and double delta coefficients are added to the set of mel-frequency cepstral coefficients and the set of mel-frequency cepstral coefficients are embodied in the form of 60-dimensional feature vectors for every one of a plurality of frames.

4. The method of claim 3, further comprising:
    encoding a set of ordering information contained in the audio recording by mapping a plurality of relative frame positions in each audio sample to fixed locations in a random lookup table;
    incorporating the encoded ordering information with the set of hidden embeddings and obtaining the set of hidden representations using a multi-head self-attention module; and
    reducing the set of hidden representations into a D-dimensional vector using a temporal pooling neural network layer, wherein D is representative of the size of a hidden layer in the neural network.

5. The method of claim 1, wherein a set of attention model parameters and the metric learner are jointly optimized using back-propagation.

6. A method for learning a set of hidden representations from an audio recording for speaker diarization, the method comprising:
    extracting a set of mel-frequency cepstral coefficients from an audio sample of an audio recording;

learning a set of hidden embeddings from the set of mel-frequency cepstral coefficients;

encoding a set of ordering information contained in the audio recording by mapping a plurality of relative frame positions in each audio sample to fixed locations in a random lookup table;

executing a multi-head self-attention mechanism, wherein a set of hidden representations are learned from the set of hidden embeddings and the set of ordering information using a feed-forward neural network; and performing temporal pooling on the set of hidden representations to reduce the set of hidden representations to a D-dimensional vector, wherein D is representative of a size of a hidden layer in the neural network;

wherein each of the hidden representations are computed using a plurality of different network parameterizations.

7. The method of claim 6, wherein weighted contributions from other temporal positions are included during the computation of each of the set of hidden representations.

8. The method of claim 6, wherein the audio recording is segmented using non-overlapping temporal segmentation.

9. The method of claim 6, wherein an attention module is stacked L times to learn deeper hidden representations.

10. The method of claim 6, further comprising encoding the set of ordering information and learning the set of hidden embeddings simultaneously.

11. The method of claim 10, wherein the set of ordering information and the set of hidden embeddings are incorporated together before being operated on by the multi-head self-attention mechanism.

12. A method for clustering samples of an audio recording for speaker diarization, the method comprising:

executing a multi-head self-attention network, wherein a set of hidden representations are learned from a set of mel-frequency cepstral coefficients representative of an audio sample using a feed-forward neural network;

constructing a triplet network using a set of samples, wherein each of the set of samples are operated on by the multi-head self-attention network, and wherein each input comprises three samples;

determining a similarity metric by calculating a triplet loss for each of the three samples of the input, wherein the similarity metric is used to cluster samples based on proximity to each other in an embedding space; and performing temporal pooling on the set of hidden representations to reduce the set of hidden representations to a D-dimensional vector, wherein D is representative of a size of a hidden layer in the neural network.

13. The method of claim 12, wherein a set of multi-head self-attention network parameters and a set of metric learner parameters are jointly optimized using back-propagation.

14. The method of claim 12, wherein one of the set of three samples is an anchor sample, wherein one of a set of three samples is a positive sample from the same class as the anchor sample, and wherein one of the set of three samples is a negative sample from a different class from the anchor sample.

15. The method of claim 12, wherein the result of clustering based on the similarity metric is speaker diarization, wherein samples in the same distinct cluster can be linked to one particular speaker.

* * * * *

UNITED STATES PATENT AND TRADEMARK OFFICE
CERTIFICATE OF CORRECTION

Page 1 of 1

PATENT NO. : 11,152,013 B2
APPLICATION NO. : 16/530304
DATED : October 19, 2021
INVENTOR(S) : Huan Song et al.

It is certified that error appears in the above-identified patent and that said Letters Patent is hereby corrected as shown below:

On the Title Page

Item (54), and in the Specification, Column 1, Lines 1-3, The title "SYSTEMS AND METHODS FOR A TRIPLET NETWORK WITH ATTENTION FOR SPEAKER DIARTZATION" should be -- SYSTEMS AND METHODS FOR A TRIPLET NETWORK WITH ATTENTION FOR SPEAKER DIARIZATION --.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*